United States Patent
Gubrinski et al.

(10) Patent No.: US 11,578,284 B2
(45) Date of Patent: Feb. 14, 2023

(54) PROCESS FOR PURIFYING A CRUDE GAS STREAM CONTAINING SULFUR COMPONENTS AND HYDROCARBONS

(71) Applicant: L'Air Liquide, Société Anonyme pour l'Etude et l'Explotation des Procédés Georges Claude, Paris (FR)

(72) Inventors: Alfred Gubrinski, Frankfurt am Main (DE); Dorit Rappold, Frankfurt am Main (DE); Michael Wilken, Frankfurt am Main (DE); Matthias Linicus, Eppstein (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 30 days.

(21) Appl. No.: 17/361,428

(22) Filed: Jun. 29, 2021

(65) Prior Publication Data

US 2021/0403822 A1 Dec. 30, 2021

(30) Foreign Application Priority Data

Jun. 29, 2020 (EP) .................................... 20020303

(51) Int. Cl.
| | | |
|---|---|---|
| *B01D 53/18* | (2006.01) | |
| *C10L 3/10* | (2006.01) | |
| *B01D 53/14* | (2006.01) | |

(52) U.S. Cl.
CPC .......... *C10L 3/103* (2013.01); *B01D 53/1406* (2013.01); *B01D 53/1418* (2013.01);
(Continued)

(58) Field of Classification Search
CPC ............ B01D 53/1425; B01D 53/1406; B01D 53/1462; B01D 53/1493; B01D 53/14;
(Continued)

(56) References Cited

U.S. PATENT DOCUMENTS

| 3,823,222 A | 7/1974 | Benson |
| 4,372,925 A | 2/1983 | Cornelisse |

(Continued)

FOREIGN PATENT DOCUMENTS

| DE | 10 2005 059 101 | 6/2007 |
| DE | 10 2009 015 368 | 9/2010 |

(Continued)

OTHER PUBLICATIONS

European Search Report for related EP 20020304, dated Dec. 3, 2020.

(Continued)

*Primary Examiner* — Sharon Pregler
(74) *Attorney, Agent, or Firm* — Elwood L. Haynes

(57) ABSTRACT

A process and a plant for purifying a crude gas stream containing sulfur components and hydrocarbons by gas scrubbing using a scrubbing medium which is selective for sulfur components in an absorption column. Heavy hydrocarbons and heavy mercaptans are removed from the crude gas in a lower section of the absorption column and the resulting, loaded scrubbing medium stream is fed separately from the other loaded scrubbing medium streams to a hot regeneration column. A vapor stream enriched in water, hydrocarbons and sulfur components is obtained as overhead product from the hot regeneration column and this stream is cooled to below its dew point and is separated in a gas-liquid-liquid phase separation apparatus. The resulting, organic liquid phase contains heavy hydrocarbons and (Continued)

heavy mercaptans and can thus be discharged from the process or the plant, as a result of which accumulation thereof in the scrubbing medium is prevented.

19 Claims, 1 Drawing Sheet

(52) U.S. Cl.
CPC ..... *B01D 53/1425* (2013.01); *B01D 53/1468* (2013.01); *B01D 53/1487* (2013.01); *B01D 53/1493* (2013.01); *B01D 53/18* (2013.01); *B01D 2252/103* (2013.01); *B01D 2252/20468* (2013.01); *B01D 2252/504* (2013.01); *C10L 2200/0263* (2013.01); *C10L 2290/541* (2013.01); *C10L 2290/545* (2013.01)

(58) Field of Classification Search
CPC .. B01D 53/18; B01D 53/0462; B01D 53/047; B01D 53/1418; B01D 53/1456; B01D 53/1468; B01D 53/1487; B01D 53/75; C10L 2290/545; C10L 3/103; C10L 2290/10; C10L 2290/12; C10L 2290/542; C10L 3/10; C10L 3/104; C10L 2200/0263; C10L 2290/541
See application file for complete search history.

(56) References Cited

U.S. PATENT DOCUMENTS

| | | |
|---|---|---|
| 5,067,972 A | 11/1991 | Hemmings et al. |
| 2007/0134148 A1 | 6/2007 | Gubrinski et al. |
| 2010/0104490 A1 | 4/2010 | Bouillon et al. |
| 2016/0250590 A1 | 9/2016 | Raynal et al. |
| 2018/0326348 A1* | 11/2018 | Tanna ...................... C10K 1/16 |

FOREIGN PATENT DOCUMENTS

| | | |
|---|---|---|
| EP | 3 539 641 | 3/2018 |
| EP | 3 583 994 | 12/2019 |
| WO | WO 2014 175337 | 10/2014 |
| WO | WO 2017 196620 | 11/2017 |
| WO | WO 2019 174787 | 9/2019 |

OTHER PUBLICATIONS

Ullmann's Encyclopedia of Industrial Chemistry, Physical absorption processes, 6th ed. vol. 15, 399-407.
European Search Report for corresponding EP 20020303, dated Dec. 1, 2020.

\* cited by examiner

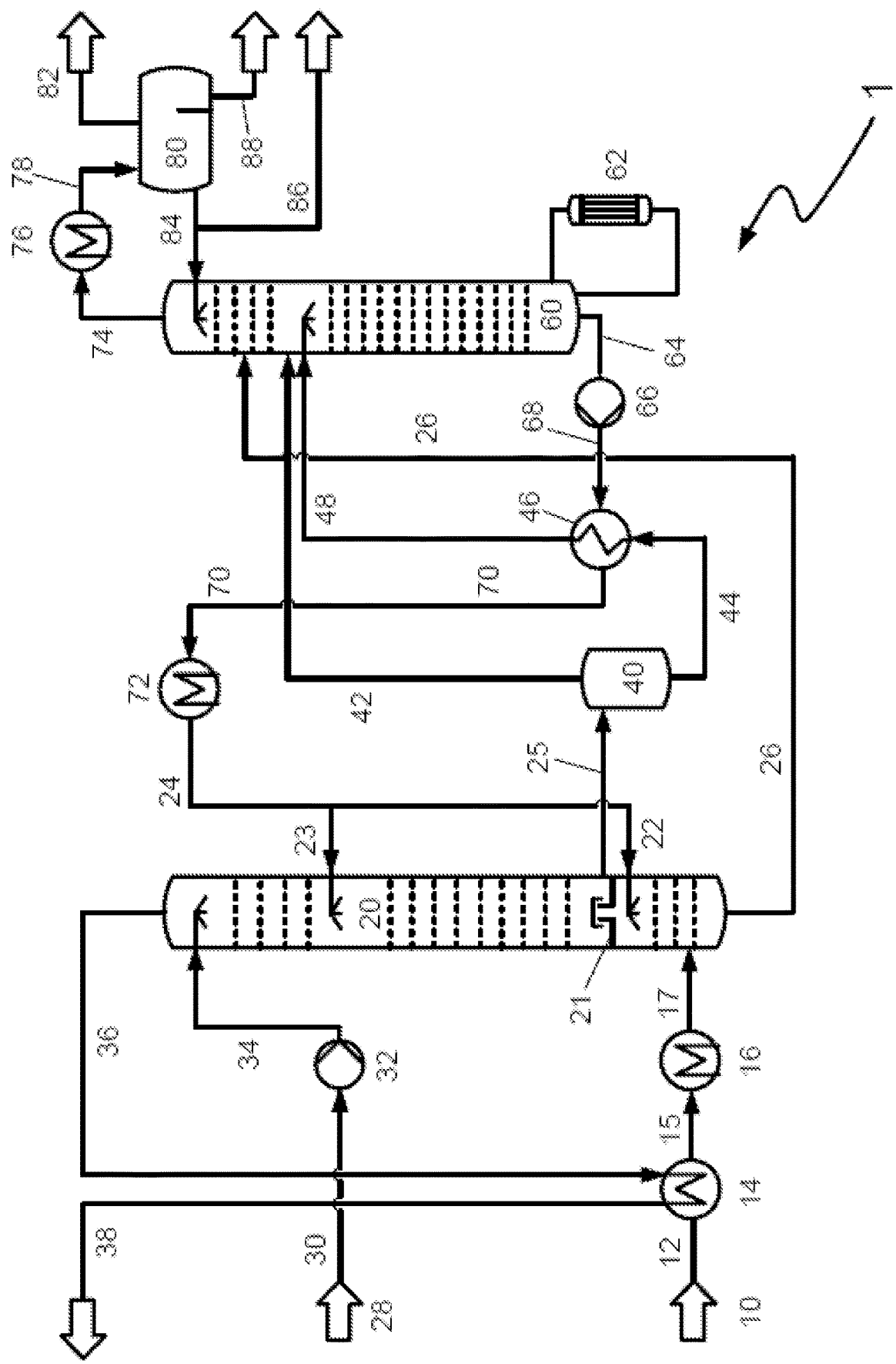

PROCESS FOR PURIFYING A CRUDE GAS STREAM CONTAINING SULFUR COMPONENTS AND HYDROCARBONS

CROSS REFERENCE TO RELATED APPLICATIONS

This application claims priority to EP 20020303, filed Jun. 29, 2020, the entire contents of which are incorporated herein by reference.

BACKGROUND

Field of the Invention

The invention relates to a process for purifying a crude gas stream containing sulfur components and hydrocarbons, for example a regeneration offgas which is obtained by backflushing or desorption of an adsorbent which has previously been used for separating sulfur components from a hydrocarbon-containing stream, for example natural gas. The invention likewise relates to a plant for performing the process according to the invention.

Prior Art

The natural gas qualities of natural gas reservoirs that are currently being utilized are getting continuously worse. Therefore, freeing the natural gas of trace impurities, for example carbonyl sulfide (COS), mercury and especially mercaptans, is becoming increasingly significant, alongside the conventional removal of hydrogen sulfide ($H_2S$), carbon dioxide ($CO_2$) and the drying or removal of water. Usually, the water components and the mercaptans are removed by adsorption on suitable adsorbents, for example molecular sieves, which entails periodic regeneration of the adsorbents. In the regeneration, the adsorbed trace constituents are usually removed by treatment of the loaded adsorbents with a purge gas (desorption step) which is then discharged as regeneration offgas.

The regeneration offgas containing the unwanted trace constituents has to be subjected to an aftertreatment since it cannot be released as such to the atmosphere and generally also cannot be used further internally. Therefore, to recover the trace components from the regeneration offgas, a purification of the regeneration offgas has to be designed for different concentrations and different types of trace constituents. In the continuous offgas treatment processes known from the prior art, gas scrubbing is effected using a liquid absorption medium or scrubbing medium. Known and frequently employed processes of this kind are the Rectisol process and the Purisol process, which are both described in principle in Ullmann's Encyclopedia of Industrial Chemistry, 6th Ed. Vol. 15, p. 399 et seq. These processes consist mainly of an absorption step and a regeneration step in which the offgas containing the trace components is released and optionally processed further.

In the Rectisol process the abovementioned unwanted disruptive components are absorbed by cold methanol, i.e. methanol cooled significantly below ambient temperature, as an absorbent or scrubbing medium, wherein intensive mass transfer between the crude gas and the absorption medium/scrubbing medium takes place in an absorber column, also known as a scrubbing column. The solubility of the unwanted gas constituents increases drastically with decreasing temperature of the methanol and increasing pressure while remaining practically constant for hydrogen and carbon monoxide. Methanol additionally has the advantage of still retaining a low viscosity and thus good mass and heat transfer properties even at temperatures down to −75° C. The methanol laden with the disruptive components and used as scrubbing medium is circulated through regeneration apparatuses in the Rectisol process.

In the Purisol process, which is likewise a physical absorption process, the trace components are absorbed by means of N-methylpyrrolidone (NMP) as absorption medium or scrubbing medium at ambient temperature or, in conjunction with a refrigeration plant, at temperatures down to −15° C. In this gas scrubbing process too, the scrubbing medium is regenerated by treatment in a regeneration plant by heating, flashing or stripping with inert gases, and recycled to the absorption part of the plant, Typical working pressures and working temperatures in the Purisol process are, respectively, from 5 to 80 bar(a) and from 0 to 60° C., and sometimes also lower, as set forth above. The scrubbing medium is regenerated by depressurization (flashing), if necessary also by heating (hot regeneration). The sulfur-containing components driven off here can be converted into elemental sulfur in a Claus plant. The regenerated physical scrubbing medium is reintroduced into the absorption.

Furthermore, there are further physical absorption and gas scrubbing processes, which differ first and foremost in the type of the scrubbing medium used which is selective for sulfur components. All these scrubbing media are liquid and at least partially miscible with water and have a boiling point higher than that of water. Examples of such scrubbing media are propylene carbonate and mixtures of polyethylene glycol dialkyl ethers, preferably polyethylene glycol dimethyl ethers.

Furthermore, particular measures for controlling the fluctuation of the concentrations of the trace components in the regeneration offgas over time during the desorption are useful. This fluctuation in the trace components over time, for example in the sulfur components, is often unacceptable for downstream plants, for example a Claus plant for recovery of sulfur. Suitable measures are therefore proposed in the patent documents DE 10 2005 059 101 A1 and WO 2019/174 787 A1.

During the adsorption step, in which the adsorbent is loaded, light and in particular relatively heavy hydrocarbons are also separated out because of their affinity to the adsorbent and/or their elevated molar mass; examples which may be mentioned are the BTX aromatics, i.e. benzene, toluene and xylenes. During backflushing or desorption of the adsorbent, these components also go into the regeneration offgas which is then fed as crude gas stream to a purification step, for example by gas scrubbing. A problem here is that relatively heavy hydrocarbons can be removed only incompletely, if at all, from the scrubbing medium in the regeneration step of the gas scrubbing process, for example in hot regeneration, because of their low volatility and thus accumulate in the scrubbing medium, which impairs the purifying action and selectivity thereof. This also applies to relatively heavy mercaptans, i.e. mercaptans having a relatively high molar mass.

SUMMARY

It is therefore an object of the present invention to avoid the above-mentioned problems and provide a process and a corresponding plant for purifying a crude gas stream containing sulfur components and hydrocarbons, in which an undesirable accumulation of heavy hydrocarbons and heavy mercaptans in the scrubbing medium is avoided.

In connection with the present invention, sulfur components are inorganic and organic, sulfur-containing components, in particular hydrogen sulfide $H_2S$, carbonyl sulfide COS, carbon disulfide (sulfide of carbon) $CS_2$ and mercaptans RSH, where R is an organic radical. Mercaptans having a radical R containing five or more carbon atoms are referred to as heavy mercaptans. Mercaptans having a radical R containing four or fewer carbon atoms, on the other hand, are referred to as light mercaptans.

For the purposes of the present invention, short-chain hydrocarbons are, in particular, hydrocarbons which are gaseous under ambient conditions, for example, methane, ethane, ethylene, propane, propylene and the isomeric butanes and butenes. For the purposes of the present invention, relatively long-chain hydrocarbons are, in particular, hydrocarbons which are liquid at ambient conditions, i.e., in particular, hydrocarbons having five or more carbon atoms. As subgroup of the relatively long-chain hydrocarbons, those nonaromatic hydrocarbons which contain nine or more carbon atoms and also aromatic hydrocarbons are referred to as heavy hydrocarbons. Owing to their boiling behavior, the BTX aromatics are also referred to as heavy hydrocarbons for the purposes of the present invention. Nonaromatic hydrocarbons containing eight or fewer carbon atoms are, by contrast, referred to as light hydrocarbons.

The states of matter solid, liquid and gaseous or in vapor form should always be interpreted as being based on local physical conditions which prevail in the respective process step or in the respective part of the plant, unless indicated otherwise. In the context of the present application, the gaseous and vapor states of matter should be considered to be synonymous.

A physically acting scrubbing medium which is selective for sulfur components is understood as a liquid material or a liquid mixture whose solution capability for sulfur components, expressed by the respective Henry constant, under given process conditions, in particular pressure and temperature, is greater than for comparably structured and/or comparably heavy, sulfur-free components. The scrubbing capability is based on the absorption of the corresponding components by uptake and distribution within the volume phase of the scrubbing medium, not on the formation of chemical bonds between scrubbing medium and component to be separated off. Accordingly, physically acting scrubbing media can generally be regenerated by lowering the pressure and/or increasing the temperature, with the previously absorbed components being recovered in a chemically unaltered form.

An absorption column, alternatively referred to as, for example, gas scrubber, scrubbing column or scrubber, is a process engineering apparatus in which a gas stream is brought into intensive contact with a liquid stream in order for the liquid to take up constituents of the gas stream. The design thereof has the objective of producing a very large liquid surface area for very good mass transfer between the gas phase and the liquid phase. This can occur by production of bubbles or droplets or by trickling over solid surfaces. For this reason, surface area-increasing internals such as trays, for example sieve trays or bubble cap trays, or structured packings are usually provided; as an alternative, sections of the absorption column can be filled with packing elements such as balls, cylinders, rings or saddles. Structurally, absorption columns are usually configured as upright tubes, optionally by combination of tube sections, which extend along a longitudinal axis running parallel to the vertical and enclose an interior space of the absorption column.

The term separation tray is to be understood as meaning all internals of absorption columns, in particular specifically structured column trays, which make it possible for vapor or gas streams ascending in the column to pass through the separation tray, while it is impermeable for liquid streams which flow or travel downward in the column, so that these collect on the separation tray and are taken off and thus discharged from the column via a separate outlet (side offtake). The separation tray is therefore also referred to as offtake tray or collection tray. It forms to a certain extent a second bottom region of the column between the upper end and the lower end of the column. A known configuration of a separation tray is as chimney tray.

A hot regeneration column is, for the purposes of the present invention, a process engineering apparatus which in terms of its construction resembles an absorption column but has the task of very largely freeing absorbent or scrubbing medium loaded with gas components of these components by desorption as a result of introduction of heat and thus of regenerating the scrubbing medium. Technically, this is, for example, achieved by the hot regeneration column being equipped with a boiler for heating the bottom region of the column, as a result of which scrubbing medium intrinsic vapor, which serves as stripping or desorption medium and thus drives forward the desorption of the gas components, is generated.

Enrichment or depletion of a component in a mixture, a fraction or a material stream is to be understood as meaning a measure, operation or process step which has the result that the mol fraction or mass fraction of this component increases (enrichment) or decreases (depletion).

The predominant part of a fraction, of a material stream, etc. is to be understood as meaning a proportion quantitatively greater than all other proportions each considered alone. Especially in the case of binary mixtures or in the case of separating a fraction into two parts, this is to be understood as meaning a proportion of more than 50% by weight unless otherwise stated in the specific case.

The statement that a material stream consists predominantly of one component or group of components is to be understood as meaning that the mol fraction or mass fraction of this component or component group is quantitatively greater than all other proportions of other components or component groups in the material stream each considered alone. Especially in the case of binary mixtures this is to be understood as meaning a proportion of more than 50%, Unless otherwise stated in the specific case, this is based on the mass fraction.

In the context of the present invention a division or resolution/separation of a stream of material is to be understood as meaning production of at least two substreams from the original stream of material, where resolution/separation is associated with an intentional alteration of the composition in terms of material of the substreams obtained relative to the original stream of material, for example by application of a thermal separation process to the original stream of material. By contrast, division of the original stream of material is generally not associated with a change in the composition in terms of material of the substreams obtained.

For the purposes of the present invention, light and heavy liquid phases are two liquid phases which are not miscible or have limited miscibility and in the rest state lie horizontally one above the other, where the light liquid phase has a lower density than the heavy liquid phase and the two phases separate from one another because of their immiscibility or limited miscibility and the light liquid phase therefore lies above the heavy liquid phase. A process engineering apparatus which is configured so that this phase separation and also the removal of a gas phase can proceed to completion is referred to as gas-liquid-liquid phase separation apparatus.

A fluid connection between two regions of the apparatus according to the invention is to be understood as meaning any type of connection which makes it possible for a fluid, for example a gas stream, to be able to flow from the one region to the other of the two regions, regardless of any interposed regions or components located in between. In particular, a direct fluid connection is to be understood as meaning any type of connection which makes it possible for a fluid, for example a gas stream, to flow directly from one to the other of the two regions, with no further regions or components being interposed, with the exception of purely transportational operations and the means required for this purpose, for example pipes, valves, pumps, compressors, reservoirs. One example would be a pipe leading directly from one to the other of the two regions.

A means is to be understood as something which makes it possible to achieve, or is helpful in achieving, an objective. In particular, means for carrying out a particular process step are all physical objects which a person skilled in the art would take into consideration in order to be able to carry out this process step. For example, a person skilled in the art will consider means of introducing or discharging a material stream to include any transporting and conveying apparatuses, i.e. for example pipes, pumps, compressors, valves, which seem necessary or sensible to said skilled person for performance of this process step on the basis of such a person's knowledge of the art, Any pressure figures in connection with the present invention which are reported in the unit bar(a) relate to the absolute pressure in bar, absolute, unless indicated otherwise in the particular case.

The invention is based on the recognition that it is advantageous firstly to prescrub the crude gas stream using a small amount of the scrubbing medium after introduction into the absorption column. This is advantageously carried out in a lower section of the absorption column which is separated from the upper section of the absorption column by means of a separation tray through which the gas phase can pass but the liquid phase cannot, preferably a chimney tray. In this way, a small amount of the second scrubbing medium stream enriched in heavy hydrocarbons and in heavy mercaptans is obtained from the lower column section, and this is then conveyed to hot regeneration and can there be optionally treated separately from other loaded scrubbing medium streams, The separate pretreatment of the crude gas stream in the lower column section additionally allows it to be optionally pretreated with a particular scrubbing medium, for example with the scrubbing medium which is also used in the upper column section but to which an additive has been added in order to increase its selectivity for heavy hydrocarbons and heavy mercaptans.

A second aspect of the process according to the invention is characterized in that part of the process condensate stream is returned as runback to the hot regeneration column. In this way, continuous operation of the hot regeneration column is made possible and it is ensured that a high water or water vapor concentration is established in the upper region of the hot regeneration column, which improves the separation of the scrubbing medium.

A third aspect of the process according to the invention is characterized in that the introduction of the first water stream into the absorption column is effected above the third scrubbing medium stream. This creates a separate absorption zone which acts as an after-scrub in which water-soluble impurities can be separated off with high selectivity.

A fourth aspect of the process according to the invention is characterized in that the water scrub is carried out in a dedicated absorption zone which is arranged in the upper column section above the inlet for the third scrubbing medium stream. The previously indicated aspect of the invention, namely creation of a separate absorption zone in which the water-soluble impurities can be separated off with high selectivity, is reinforced further thereby.

A fifth aspect of the process according to the invention is characterized in that the discharge of the fourth scrubbing medium stream from the upper column section occurs after collection on the upper side of the separation tray, with the latter being configured as offtake tray or collection tray, in particular as chimney tray. In this way, a scrubbing medium stream which is loaded with impurities and is depleted in heavy hydrocarbons and in heavy mercaptans and can therefore be treated in a particular way, without a presence of the components mentioned having to be taken into account, is obtained.

A sixth aspect of the process according to the invention is characterized in that the fourth scrubbing medium stream is fed into a flash vessel and there separated into a flash vapor stream and a fifth scrubbing medium stream, which are both introduced into the hot regeneration column, with the fifth scrubbing medium stream being preheated by indirect heat exchange with the bottom product stream before introduction into the hot regeneration column and the bottom product stream being cooled thereby. Both streams of material, i.e. the flash vapor stream and the heated fifth scrubbing medium stream are then fed into the hot regeneration column. The prior removal of the flash vapor stream prevents a large additional amount of vapor being liberated from the fifth scrubbing medium stream on heating of the latter before introduction into the hot regeneration column, which makes particular precautions for the transport of a two-phase stream superfluous.

A seventh aspect of the process according to the invention is characterized in that the acid gas stream is fed to a Claus plant for isolating sulfur. In this way, the sulfur component can be recovered as product of value.

An eighth aspect of the process according to the invention is characterized in that part of the organic purge stream is recirculated to the absorption column and is introduced into this at the upper end of the lower column section, with the introduction occurring separately from or together with the first scrubbing medium stream. The part of the organic purge stream which is introduced into the lower column section at the same time acts as additive for increasing the selectivity of the scrubbing medium there for heavy hydrocarbons and heavy mercaptans; the removal of these in the lower column section is therefore improved further. Depending on the content and type of the heavy hydrocarbons and heavy mercaptans, it can be advantageous to premix the recirculated part of the organic purge stream with the first scrubbing medium stream and introduce it together with the latter into the lower column section, since a homogeneous distribution of the additive in the first scrubbing medium stream is achieved in this way. As an alternative, it can be advantageous for other uses for the additive to be introduced separately into a sharply defined zone of the lower column section and thus create a sharply delimited scrubbing zone with high selectivity for heavy hydrocarbons and heavy mercaptans.

A ninth aspect of the process according to the invention is characterized in that the second scrubbing medium stream and the fourth and/or the fifth scrubbing medium stream are introduced separately into the hot regeneration column, with the second scrubbing medium stream being introduced above the fourth and/or fifth scrubbing medium stream into the hot regeneration column. The second scrubbing medium stream contains the highly concentrated heavy hydrocarbons and heavy mercaptans and thus meets a vapor stream which has already been enriched in water vapor compared to the introduction point of the fourth or fifth scrubbing medium stream located further below in the column and has been depleted in the scrubbing medium. Owing to the resulting high polarity in the upper part of the hot regeneration column, the driving-off of the heavy hydrocarbons and heavy mercaptans from the liquid phase is assisted and the subsequent liquid-liquid phase separation is improved, since the local concentration of the scrubbing medium as solubilizer is lower here.

A tenth aspect of the process according to the invention is characterized in that at least one scrubbing medium selected from the following group: N-methyl-2-pyrrolidone (NMP), propylene carbonate, mixtures of polyethylene glycol dialkyl ethers, preferably polyethylene glycol dimethyl ethers, is used as scrubbing medium which is selective for sulfur components. All the scrubbing media are liquid and at least partially miscible with water and have a boiling point higher than that of water. They are therefore advantageous for use in the process according to the invention.

In a further aspect, the plant according to the invention is characterized in that it further comprises means which allow part of the process condensate stream to be recirculated as runback to the hot regeneration column. The advantages of this aspect of the plant of the invention correspond to those described in connection with the second aspect of the process according to the invention.

In a further aspect, the plant according to the invention is characterized in that it further comprises means which allow the first water stream to be introduced above the third scrubbing medium stream into the absorption column. The advantages of this aspect of the plant according to the invention correspond to those described in connection with the third aspect of the process according to the invention.

In a further aspect, the plant according to the invention is characterized in that it further comprises means which allow the water scrub to occur in a dedicated absorption zone which is arranged in the upper column section above the inlet for the third scrubbing medium stream. The advantages of this aspect of the plant according to the invention correspond to those described in connection with the fourth aspect of the process according to the invention.

In a further aspect, the plant according to the invention is characterized in that it further comprises means which allow discharge of the fourth scrubbing medium stream from the upper column section to occur after collection on the upper side of the separation tray, with the latter being configured as offtake tray or collection tray, in particular as chimney tray. The advantages of this aspect of the plant according to the invention correspond to those described in connection with the fifth aspect of the process according to the invention.

In a further aspect, the plant according to the invention is characterized in that it further comprises means which allow the fourth scrubbing medium stream to be fed into a flash vessel and be separated there into a flash vapor stream and a fifth scrubbing medium stream, which are both introduced into the hot regeneration column, with the fifth scrubbing medium stream being preheated by indirect heat exchange with the bottom product stream before introduction into the hot regeneration column and the bottom product stream being cooled thereby. The advantages of this aspect of the plant according to the invention correspond to those described in connection with the sixth aspect of the process according to the invention.

In a further aspect, the plant according to the invention is characterized in that it further comprises means which allow the acid gas stream to be fed to a Claus plant for isolating sulfur. The advantages of this aspect of the plant according to the invention correspond to those described in connection with the seventh aspect of the process according to the invention.

In a further aspect, the plant according to the invention is characterized in that it further comprises means which allow part of the organic purge stream to be recirculated to the absorption column and to be introduced into the latter at the upper end of the lower column section, with the introduction occurring separately from or together with the first scrubbing medium stream. The advantages of this aspect of the plant according to the invention correspond to those described in connection with the eighth aspect of the process according to the invention.

In a further aspect, the plant according to the invention is characterized in that it further comprises means which allow the second scrubbing medium stream and the fourth and/or the fifth scrubbing medium stream to be introduced separately into the hot regeneration column, with the second scrubbing medium stream being introduced above the fourth and/or fifth scrubbing medium stream into the hot regeneration column. The advantages of this aspect of the plant according to the invention correspond to those described in connection with the ninth aspect of the process according to the invention.

BRIEF DESCRIPTION OF THE DRAWING

Further features, advantages and possible applications of the invention may also be derived from the following description of working examples and the drawings. All the features described and/or depicted form, either on their own or in any combination, the subject matter of the invention, irrespective of the way in which they are combined in the claims or their back-references.

The single FIGURE shows:

FIG. 1 is a schematic depiction of a preferred configuration of the process according to the invention or of a corresponding plant.

DETAILED DESCRIPTION OF PREFERRED EMBODIMENTS

FIG. 1 shows a schematic depiction of a process and a corresponding plant 1 for purifying a crude gas stream containing sulfur components and hydrocarbons, in the present example a regeneration offgas as crude gas which is obtained by backflushing or desorption of an adsorbent which has previously been used for removal of sulfur components from a natural gas stream.

The crude gas stream to be purified, which in one example is at a pressure of from 25 to 30 bar(a) and in a further example is at a pressure of from 25 to 55 bar(a), is introduced via a feed conduit 10 into the process or the plant 1 and is fed via conduit 12 to a heat exchanger 14 in which the crude gas stream is cooled by indirect heat exchange with a pure gas stream which is brought via conduit 36 and is discharged via conduit 38. The crude gas stream which has been precooled in this way is discharged from the heat exchanger 14 via conduit 15 and fed to a further heat exchanger 16 in which further cooling of the crude gas stream occurs by indirect heat exchange with a cooling medium. The crude gas stream which has accordingly been cooled to an entry temperature of, for example, from 10 to 25° C. is discharged from the heat exchanger via conduit 17 and introduced into an absorption column 20.

The absorption column 20 is, in the present example, configured as tray column with sieve trays as mass transfer zones. Further possible configurations of the mass transfer zones having essentially the same effect include a configuration as tray column having other types of trays, for example bubble cap trays, as pack column having appropriate packing elements, for example balls, rings or saddles, or as column having structured packing elements. The mass transfer zones are indicated as broken lines in FIG. 1. A distribution device for liquids supplied to the column is indicated above each mass transfer zone. In the present example, the absorption column accordingly comprises three mass transfer zones which perform different tasks and are supplied with different scrubbing media. All embodiments according to the invention have in common a division of the absorption column into an upper column section above a separation tray 21 and a lower column section below the separation tray 21, which tray is in the present example configured as chimney tray.

The cooled crude gas is introduced via conduit 17 into the lower end of the lower column section of the absorption column 20 and is, in a first mass transfer zone present there, brought into contact in countercurrent with a small amount of the regenerated scrubbing medium which in the present example contains NMP as sulfur-selective agent and is introduced as first scrubbing medium stream via conduit 22 into the lower column section of the absorption column 20. In one example, the first scrubbing medium stream (conduit 22) corresponds to from 1 to 10% by volume, preferably from 1 to 5% by volume, of the main solvent stream in conduit 24.

The crude gas stream which has thus been depleted in heavy hydrocarbons and heavy mercaptans is discharged from the lower column section through the separation tray 21 and introduced into the upper column section. The scrubbing medium stream which has been enriched in heavy hydrocarbons and in heavy mercaptans is discharged as second scrubbing medium stream via conduit 26 from the lower column section of the absorption column and fed to the hot regeneration column 60.

The crude gas stream which has been depleted in heavy hydrocarbons and heavy mercaptans and has been introduced by the separation tray 21 into the lower region of the upper column section of the absorption column goes into a further, second mass transfer zone in which it is brought into contact in countercurrent with a further part of the NMP-containing scrubbing medium which is brought as third scrubbing medium stream via conduits 24 and 23, introduced into the absorption column and introduced into the latter by means of a distribution device indicated in the FIGURE above the second mass transfer zone. This second mass transfer zone has, inter alia, the task of scrubbing out light mercaptans from the crude gas stream.

The crude gas stream which has been depleted in light mercaptans and exits in an upward direction from the second mass transfer zone goes into a further, third mass transfer zone in which it is brought into contact in countercurrent with a first water stream which is conveyed to the absorption column via feed conduit 28, conduit 30, pump 32 and conduit 34 and is introduced by means of a distribution device indicated in the FIGURE above the third mass transfer zone into the latter. This third mass transfer zone has, inter alia, the task of scrubbing out remaining, water-soluble impurities, for example hydrogen sulfide, from the crude gas stream. The crude gas stream which has thus been depleted in light mercaptans and in hydrogen sulfide is discharged as pure gas stream from the absorption column via conduits 36 and 38 and heat exchanger 14 and passed to a use which is not depicted.

The scrubbing medium streams which contain water and NMP and are loaded with absorbed materials such as mercaptans and hydrogen sulfide and flow out from the second mass transfer zone and the third mass transfer zone are collected on the separation tray and discharged from this via conduit 25, discharged as fourth scrubbing medium stream from the absorption column and introduced into a flash vessel 40. In this, a flash vapor stream is separated off by depressurization of the fourth scrubbing medium stream and is discharged via conduit 42 and fed to the hot regeneration column 60. Furthermore, a fifth scrubbing medium stream which is depleted in volatile components is obtained. The fifth scrubbing medium stream is discharged via conduit 44 from the flash vessel and before introduction into the hot regeneration column via conduit 48 is preheated in a heat exchanger 46 by indirect heat exchange with the bottom product stream of the hot regeneration column, by means of which this bottom product stream is precooled.

In the present working example, the hot regeneration column 60 comprises an upper mass transfer zone and a lower mass transfer zone, which are each configured as sieve trays. Further possible embodiments of the mass transfer zones which have essentially the same effect include a configuration as tray column having different types of trays, for example bubble cap trays, as pack column with appropriate packing elements, for example balls, rings or saddles, or as column having structured packing elements. The mass transfer zones are indicated as broken lines in FIG. 1. A distribution device for liquids supplied to the column is indicated above each mass transfer zone. Furthermore, the hot regeneration column comprises a boiler which has a feed conduit and discharge conduit 62 and by means of which heat energy is supplied to the hot regeneration column, as a result of which scrubbing medium intrinsic vapor is generated and ascends in the hot regeneration column and serves as stripping medium for the materials to be desorbed from the scrubbing medium. A hot scrubbing medium which has been depleted in water, hydrocarbons and sulfur components and has thus been regenerated is thus obtained at the bottom of the hot regeneration column and this is discharged as bottom product from the hot regeneration column via conduit 64, pump 66 and conduit 68, precooled in a heat exchanger 46 and then fed via conduit 70 to a heat exchanger 72 and cooled in the latter to the scrubbing medium temperature required in the absorption column. It can then be recirculated as first or third scrubbing medium stream to the absorption column via conduits 24, 23 and 22.

In the present working example, the fifth scrubbing medium stream and the flash vapor stream obtained from the fourth scrubbing medium stream are introduced via conduits 48 and 42 into the hot regeneration column above the lower mass transfer zone, while the second scrubbing medium stream, which has been discharged via conduit 26 from the lower column section of the absorption column and fed to the hot regeneration column 60, is introduced by means of a suitable distribution device into the hot regeneration column at a point within or above (not depicted) the upper mass transfer zone. The second scrubbing medium stream contains part, in one example the predominant part, of the heavy hydrocarbons and heavy mercaptans present in the stream 10 and in the upper mass transfer zone thus meets a vapor stream which has already been enriched in water vapor compared to the introduction point of the fourth or fifth scrubbing medium stream located further below in the column and is depleted in the scrubbing medium. Owing to the high resulting water content of the stripping vapor in the upper part of the hot regeneration column, the driving-off of the heavy hydrocarbons and heavy mercaptans from the liquid phase is assisted and the subsequent liquid-liquid phase separation is improved, since the local concentration of the scrubbing medium as solubilizer is lower here.

A gaseous overhead product stream which is enriched in water, hydrocarbons and sulfur components is discharged via conduit 74 from the hot regeneration column, cooled in a heat exchanger 76 to below its dew point and conveyed via conduit 78 to a gas-liquid-liquid phase separation apparatus 80 and introduced into the latter. In the gas-liquid-liquid phase separation apparatus, the gaseous overhead product stream which has been cooled below its dew point is separated into the following phases:

a) a gas phase which contains hydrogen sulfide and light mercaptans and is discharged as acid gas stream from the process via conduit 82, b) a light liquid phase which contains heavy hydrocarbons and heavy mercaptans and is discharged as organic purge stream from the process via conduit 88 and c) a heavy, water-containing liquid phase which is at least partly discharged as process condensate stream from the process via conduits 84 and 86. The remaining part of the water-containing, heavy liquid phase is recirculated as runback via conduit 84 to the top of the hot regeneration column and supplied to this column there.

In one example, part of the organic purge stream discharged via conduit 88 from the process or from the plant can be recirculated (not depicted) to the gas-liquid-liquid phase separation apparatus 80 in order to improve the liquid-liquid phase separation. The proportion of the amount recirculated can, in one example, be from greater than 0 to 60% by volume of the stream conveyed in conduit 88. In a further example, the proportion of the amount recirculated can be from greater than 0 to 40% by volume of the stream conveyed in conduit 88. In a further example, the proportion of the amount recirculated can be from greater than 0 to 20% by volume of the stream conveyed in conduit 88.

In a further development of the invention, the acid gas stream obtained under (a) can be fed to a Claus plant (not depicted) for isolating elemental sulfur. In this way, the sulfur component can be recovered as product of value.

In another further development of the invention, products of value, for example the BTX aromatics, i.e. benzene, toluene and xylenes, can be isolated in a manner known to a person skilled in the art from the organic purge stream obtained under (b).

LIST OF REFERENCE NUMERALS

[1] Process and plant
[10] Feed conduit
[12] Conduit
[14] Heat exchanger
[15] Conduit
[16] Heat exchanger
[20] Absorption column
[21] Separation tray
[22]-[26] Conduit
[28] Feed conduit
[30] Conduit
[32] Pump
[34]-[38] Conduit
[40] Flash vessel
[42]-[44] Conduit
[46] Heat exchanger
[48] Conduit
[60] Hot regeneration column
[62] Boiler with feed conduit and discharge conduit
[64] Conduit
[66] Pump
[68]-[70] Conduit
[72] Heat exchanger
[74] Conduit
[76] Heat exchanger
[80] Gas-liquid-liquid phase separation apparatus
[82]-[88] Conduit It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for purifying a crude gas stream containing hydrocarbons and sulfur components:

a) providing an absorption column having a plurality of adsorption zones, where the absorption column is divided by a gas-permeable and liquid-impermeable separation tray into a lower column section below the separation tray and an upper column section above the separation tray, b) introducing the crude gas stream into the lower region of the lower column section and introducing a first scrubbing medium stream into the upper region of the lower column section, contacting the crude gas stream with the first scrubbing medium stream countercurrently, discharging a crude gas stream depleted in heavy hydrocarbons and heavy mercaptans from the lower column section and introducing the crude gas stream depleted in heavy hydrocarbons and heavy mercaptans into the lower region of the upper column section through the separation tray, discharging a second scrubbing medium stream enriched in heavy hydrocarbons and heavy mercaptans from the lower column section, wherein the scrubbing medium comprises a physically active, liquid, water-miscible scrubbing medium which has a boiling paint higher than that of water and is selective for sulfur components;

c) introducing a third scrubbing medium stream and a first water stream into the upper column section, contacting the crude gas stream depleted in heavy hydrocarbons and heavy mercaptans with the third scrubbing medium stream and the first water stream in countercurrently, discharging a crude gas stream depleted in light mercaptans and hydrogen sulfide as pure gas stream from the upper region of the upper column section, discharging a fourth scrubbing medium stream enriched in light mercaptans, hydrogen sulfide, and water from the lower region of the upper column section;

d) introducing the second scrubbing medium stream and the fourth scrubbing medium stream into a hot regeneration column to regenerate the second scrubbing medium stream and the fourth scrubbing medium stream by stripping with intrinsic vapor generated by heating of the bottom region of the column;

e) discharging a bottom product stream depleted in water, hydrocarbons and sulfur components from the hot regeneration column, cooling the bottom product stream, recirculating the cooled bottom product stream to the absorption column and introducing the cooled bottom product stream as first and/or third scrubbing medium stream into the absorption column;

f) discharging a gaseous overhead product stream enriched in water, hydrocarbons, and sulfur components from the hot regeneration column, cooling the gaseous overhead product stream to below its dew point and introducing the gaseous overhead product stream which has been cooled to below its dew point into a gas-liquid-liquid phase separation apparatus;

g) separating the gaseous overhead product stream which has been cooled to below its dew point into:

a gas phase containing hydrogen sulfide and light mercaptans and is discharged as an acid gas stream, a light liquid phase containing heavy hydrocarbons and heavy mercaptans and is discharged as an organic purge stream, and a heavy liquid phase containing water and is at least partly discharged as a process condensate stream.

2. The process as claimed in claim 1, wherein part of the process condensate stream is recirculated as a runback to the hot regeneration column.

3. The process as claimed in claim 1, wherein the introduction of the first water stream into the absorption column is effected above the third scrubbing medium stream.

4. The process as claimed in claim 3, wherein the water scrub is carried out in a dedicated absorption zone which is arranged in the upper column section above the inlet for the third scrubbing medium stream.

5. The process as claimed in claim 1, wherein the discharge of the fourth scrubbing medium stream from the upper column section occurs after collection on the upper side of the separation tray, with the latter being configured as an offtake tray or collection fray.

6. The process as claimed in claim 1, wherein the fourth scrubbing medium stream is fed into a flash vessel and therein separated into a flash vapor stream and a fifth scrubbing medium stream, which are both introduced into the hot regeneration column, with the fifth scrubbing medium stream being preheated by indirect heat exchange with the bottom product stream before introduction into the hot regeneration column and the bottom product stream being cooled thereby.

7. The process as claimed in claim 1, wherein the acid gas stream is fed to a Claus plant for isolating elemental sulfur.

8. The process as claimed in claim 1, wherein part of the organic purge stream is recirculated to the absorption column and is introduced into this at the upper end of the lower column section, with the introduction occurring separately from or together with the first scrubbing medium stream.

9. The process as claimed in claim 1, wherein the second scrubbing medium stream and the fourth and/or the fifth scrubbing medium stream are introduced separately into the hot regeneration column, with the second scrubbing medium stream being introduced above the fourth and/or fifth scrubbing medium stream into the hot regeneration column.

10. The process as claimed in claim 1, wherein at least one scrubbing medium selected from the following group: N-methyi-2-pyrrolidone (NMP), propylene carbonate, mixtures of polyethylene glycol dialkyl ethers.

11. A plant for purifying a crude gas stream containing hydrocarbons and sulfur components:

a) means for providing an absorption column having a plurality of adsorption zones, where the absorption column is divided by a gas-permeable and liquid-impermeable separation tray into a lower column section below the separation tray and an upper column section above the separation tray, b) means for introducing the crude gas stream into the lower region of the lower column section and introducing a first scrubbing medium stream into the upper region of the lower column section, contacting the crude gas stream with the first scrubbing medium stream countercurrently, discharging a crude gas stream depleted in heavy hydrocarbons and heavy mercaptans from the lower column section and introducing the crude gas stream depleted in heavy hydrocarbons and heavy mercaptans into the lower region of the upper column section through the separation tray, discharging a second scrubbing medium stream enriched in heavy hydrocarbons and heavy mercaptans from the lower column section, wherein the scrubbing medium comprises a physically active, liquid, water-miscible scrubbing medium which has a boiling paint higher than that of water and is selective for sulfur components;

c) means for introducing a third scrubbing medium stream and a first water stream into the upper column section, contacting the crude gas stream depleted in heavy hydrocarbons and heavy mercaptans with the third scrubbing medium stream and the first water stream in countercurrently, discharging a crude gas stream depleted in light mercaptans and hydrogen sulfide as pure gas stream from the upper region of the upper column section, discharging a fourth scrubbing medium stream enriched in light mercaptans, hydrogen sulfide, and water from the lower region of the upper column section;

d) means for introducing the second scrubbing medium stream and the fourth scrubbing medium stream into a hot regeneration column to regenerate the second scrubbing medium stream and the fourth scrubbing medium stream by stripping with intrinsic vapor generated by heating of the bottom region of the column;

e) means for discharging a bottom product stream depleted in water, hydrocarbons and sulfur components from the hot regeneration column, cooling the bottom product stream, recirculating the cooled bottom product stream to the absorption column and introducing the cooled bottom product stream as first and/or third scrubbing medium stream into the absorption column;

f) means for discharging a gaseous overhead product stream enriched in water, hydrocarbons, and sulfur components from the hot regeneration column, cooling the gaseous overhead product stream to below its dew point and introducing the gaseous overhead product stream which has been cooled to below its dew point into a gas-liquid-liquid phase separation apparatus;

g) means for separating the gaseous overhead product stream which has been cooled to below its dew point into:

a gas phase containing hydrogen sulfide and light mercaptans and is discharged as an acid gas stream, a light liquid phase containing heavy hydrocarbons and heavy mercaptans and is discharged as an organic purge stream, and a heavy liquid phase containing water and is at least partly discharged as a process condensate stream.

12. The plant as claimed in claim 11, further comprising a means which allow part of the process condensate stream to be recirculated as runback to the hot regeneration column.

13. The plant as claimed in claim 11, further comprising a means which allow the first water stream to be introduced above the third scrubbing medium stream into the absorption column.

14. The plant as claimed in claim 13, further comprising a means which allow the water scrub to occur in a dedicated absorption zone which is arranged in the upper column section above the inlet for the third scrubbing medium stream.

15. The plant as claimed in claim 11, further comprising a means which allow discharge of the fourth scrubbing medium stream from the upper column section to occur after collection on the upper side of the separation tray, with the latter being configured as offtake tray or collection tray.

16. The plant as claimed in claim 11, further comprising a means which allow the fourth scrubbing medium stream to be fed into a flash vessel and be separated there into a flash vapor stream and a fifth scrubbing medium stream, which are both introduced into the hot regeneration column, with the fifth scrubbing medium stream being preheated by indirect heat exchange with the bottom product stream before introduction into the hot regeneration column and the bottom product stream being cooled thereby.

17. The plant as claimed in claim 11, further comprising a means which allow the acid gas stream to be fed to a Claus plant for isolating sulfur.

18. The plant as claimed in claim 11, further comprising a means which allow part of the organic purge stream to be recirculated to the absorption column and to be introduced into the latter at the upper end of the lower column section, with the introduction occurring separately from or together with the first scrubbing medium stream.

19. The plant as claimed in claim 11, further comprising a means which allow the second scrubbing medium stream and the fourth and/or the fifth scrubbing medium stream to be introduced separately into the hot regeneration column, with the second scrubbing medium stream being introduced above the fourth and/or fifth scrubbing medium stream into the hot regeneration column.

* * * * *